(12) United States Patent
Hata et al.

(10) Patent No.: US 11,479,236 B2
(45) Date of Patent: Oct. 25, 2022

(54) CONTROL SYSTEM FOR HYBRID VEHICLE

(71) Applicant: Toyota Jidosha Kabushiki Kaisha, Toyota (JP)

(72) Inventors: Kensei Hata, Shizuoka-ken (JP); Akiko Nishimine, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 451 days.

(21) Appl. No.: 16/672,908

(22) Filed: Nov. 4, 2019

(65) Prior Publication Data
US 2020/0139958 A1   May 7, 2020

(30) Foreign Application Priority Data

Nov. 6, 2018 (JP) .............................. JP2018-208608

(51) Int. Cl.
*B60W 20/30* (2016.01)
*B60K 11/02* (2006.01)
(Continued)

(52) U.S. Cl.
CPC ............ *B60W 20/30* (2013.01); *B60K 6/36* (2013.01); *B60K 11/02* (2013.01); *B60K 31/00* (2013.01);
(Continued)

(58) Field of Classification Search
CPC .. B60W 20/30; B60W 10/08; B60W 30/1843; B60W 2710/0644; B60W 2710/081; B60W 10/06; B60W 2520/10; B60W 2540/10; B60W 2710/083; B60W 20/11; B60W 30/1882; B60W 2710/0666; B60W 10/10; B60W 20/15; B60W 2510/0638; B60W 2510/0666; B60W 2510/087; B60W 2510/107; B60K 6/36; B60K 11/02; B60K 31/00; B60K 6/365; B60K 6/445; F02D 11/105; F02D 31/001; F02D 35/02; F02D 41/0215; F02D 2200/023; F02D 29/02; Y02T 10/40;
(Continued)

(56) References Cited

U.S. PATENT DOCUMENTS

2013/0116869 A1* 5/2013 Liu .................. B60W 10/11
180/65.265
2014/0195090 A1* 7/2014 Takeuchi .......... B60W 30/1882
903/903

(Continued)

FOREIGN PATENT DOCUMENTS

JP    2006-144641 A    6/2006
WO   2013042177 A1   3/2013

*Primary Examiner* — Sizo B Vilakazi
(74) *Attorney, Agent, or Firm* — Dinsmore & Shohl LLP

(57) ABSTRACT

A control system for a hybrid vehicle configured to suppress a temperature rise in a transmission while achieving a required driving force without modifying a cooling system. If a temperature in the transmission is lower than a threshold level during propulsion in a hybrid mode, a controller operates an engine at an optimally fuel efficient point. If the temperature in the transmission system is equal to or higher than the threshold level during propulsion in a hybrid mode, the controller shifts the operating point of the engine to the point at which the heat generation in the transmission system can be suppressed.

4 Claims, 4 Drawing Sheets

(51) Int. Cl.
   *F02D 31/00*    (2006.01)
   *F02D 11/10*    (2006.01)
   *F02D 35/02*    (2006.01)
   *B60K 6/36*     (2007.10)
   *B60W 10/08*    (2006.01)
   *B60W 30/184*   (2012.01)
   *B60K 31/00*    (2006.01)

(52) U.S. Cl.
   CPC ........ *B60W 10/08* (2013.01); *B60W 30/1843* (2013.01); *F02D 11/105* (2013.01); *F02D 31/001* (2013.01); *F02D 35/02* (2013.01); *B60W 2710/0644* (2013.01); *B60W 2710/081* (2013.01)

(58) Field of Classification Search
   CPC ........... Y02T 10/62; Y02T 10/84; F01M 1/02; F01M 5/002; F16H 57/0412
   See application file for complete search history.

(56) References Cited

U.S. PATENT DOCUMENTS

| | | | |
|---|---|---|---|
| 2018/0178779 A1* | 6/2018 | Inagawa | B60W 20/40 |
| 2019/0031022 A1* | 1/2019 | Hidaka | B60K 6/52 |
| 2020/0172084 A1* | 6/2020 | Endo | B60W 20/15 |

\* cited by examiner

CONTROL SYSTEM FOR HYBRID VEHICLE

CROSS REFERENCE TO RELATED APPLICATIONS

The present application claims the benefit of priority to Japanese Patent Application No. 2018-208608 filed on Nov. 6, 2018 with the Japanese Patent Office.

BACKGROUND

Field of the Disclosure

Embodiments of the present disclosure relate to the art of a control system for a hybrid vehicle in which a prime mover includes an engine and a motor.

Discussion of the Related Art

In a conventional hybrid vehicle having a continuously variable transmission, an engine speed and an output torque may be controlled independently, and the engine speed may be adjusted by a motor. WO 2013/042177 A1 describes one example of a control system for the hybrid vehicle of this kind. In the hybrid vehicle taught by WO 2013/042177 A1, speed of an engine is controlled by a first motor in a fuel efficient manner. According to the teachings of WO 2013/042177 A1, the control system is configured to shift an operating point of the engine in line with a driver's preference. Specifically, the control system taught by WO 2013/042177 A1 is configured to shift the operating point of the engine to increase torque when a driver depresses an accelerator pedal deeply so as to enhance agility (e.g., longitudinal acceleration) of the vehicle.

According to the teachings of WO 2013/042177 A1, therefore, fuel efficiency can be improved while manipulating the vehicle in line with the driving preference of the driver. However, the hybrid vehicle of this kind has a plurality of heat sources and exothermic members e.g., in the transmission. Therefore, if the hybrid vehicle is operated in an optimally fuel efficient manner and in line with the driving preference of the driver, the transmission, the motor, a power split mechanism etc. may be heated excessively.

If the transmission is heated excessively, for example, the transmission may be damaged thermally thereby increasing a power loss. Such disadvantages may be avoided by arranging an additional cooling system or by enhancing a cooling performance of an existing cooling system such as an oil cooler. However, a manufacturing cost of the vehicle will be increased or the existing cooling system will be enlarged.

SUMMARY

Aspects of the present disclosure have been conceived noting the foregoing technical problems, and it is therefore an object of the present disclosure to provide a control system for a hybrid vehicle configured to suppress a temperature rise in a transmission while achieving a required driving force, without modifying a cooling system.

The control system according to the embodiment of the present disclosure is applied to a hybrid vehicle comprising: an engine; at least one motor; a transmission system that transmits an output torque of the engine to drive wheels; and a cooling system that cools the transmission system and the engine. The transmission system includes a differential mechanism comprising a first rotary element to which the torque of the engine is applied, a second rotary element which is connected to the drive wheels in a torque transmittable manner, and a third rotary element to which a torque of the motor is applied. The hybrid vehicle to which the control system is applied may be propelled in a hybrid mode by delivering the torque of the engine to the drive wheels. In order to achieve the above-explained objective, according to the embodiment of the present disclosure, the control system is provided with a controller that is configured to: control the engine at an optimally fuel efficient point in a case that a temperature in the transmission system is lower than a threshold level during propulsion in the hybrid mode; and shift an operating point of the engine to a point at which a heat generation in the transmission system can be suppressed in a case that the temperature in the transmission system is equal to or higher than the threshold level during propulsion in the hybrid mode.

In a non-limiting embodiment, the operating point of the engine may be controlled by the motor. In addition, the controller may be further configured to suppress the heat generation in the transmission system by adjusting a speed of the motor within a predetermined low speed range thereby shifting the operating point of the engine to the point at which the heat generation in the transmission system can be suppressed.

In a non-limiting embodiment, the controller may be further configured to: calculate a required power to be generated by the engine; determine whether the required power is equal to or higher than a threshold value at a predetermined speed of the vehicle; shift the operating point of the engine from the optimally fuel efficient point to a point at which the heat generation in the transmission system can be suppressed while achieving the required power by reducing the speed of the engine in a case that the required power is equal to or higher than the threshold value; and shift the operating point of the engine from the optimally fuel efficient point to a point at which the heat generation in the transmission system can be suppressed while achieving the required power by increasing the speed of the engine in a case that the required power is less than the threshold value.

In a non-limiting embodiment, the cooling system may include an oil cooler and a radiator. In addition, the controller may be further configured to determine whether the temperature in the transmission system is equal to or higher than the threshold level based on at least one of temperatures of the motor, oil in the transmission system, coolant water of the radiator.

In a non-limiting embodiment, the threshold value may be increased with an increase in the speed of the vehicle.

Thus, according to the exemplary embodiment of the present disclosure, the heat generation in the transmission system is suppressed by controlling the operating point of the engine. For example, in the case that the temperature in the transmission system is lower than the threshold level, the controller operates the engine at the optimally fuel efficient point. By contrast, in the case that the temperature in the transmission system is equal to or higher than the threshold level, the controller shifts the operating point of the engine to the point at which the heat generation in the transmission system can be suppressed. According to the exemplary embodiment of the present disclosure, therefore, the heat generation in the transmission system can be suppressed without enhancing cooling performance of the existing cooling system and without employing an additional cooling system. In other words, the heat generation in the transmission system can be suppressed without increasing a manufacturing cost of the vehicle.

In addition, a power loss in the transmission system may also be reduced by thus suppressing the heat generation in the transmission system. Further, since the speed of the motor is restricted within the low speed range to shift the operating point of the engine, a mechanical loss resulting from an increase in the speed of the motor may also be reduced.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Embodiments of the present disclosure will now be explained with reference to the accompanying drawings. Note that the embodiments shown below are merely examples of the present disclosure, and do not limit a scope of the present disclosure.

Figure 1:
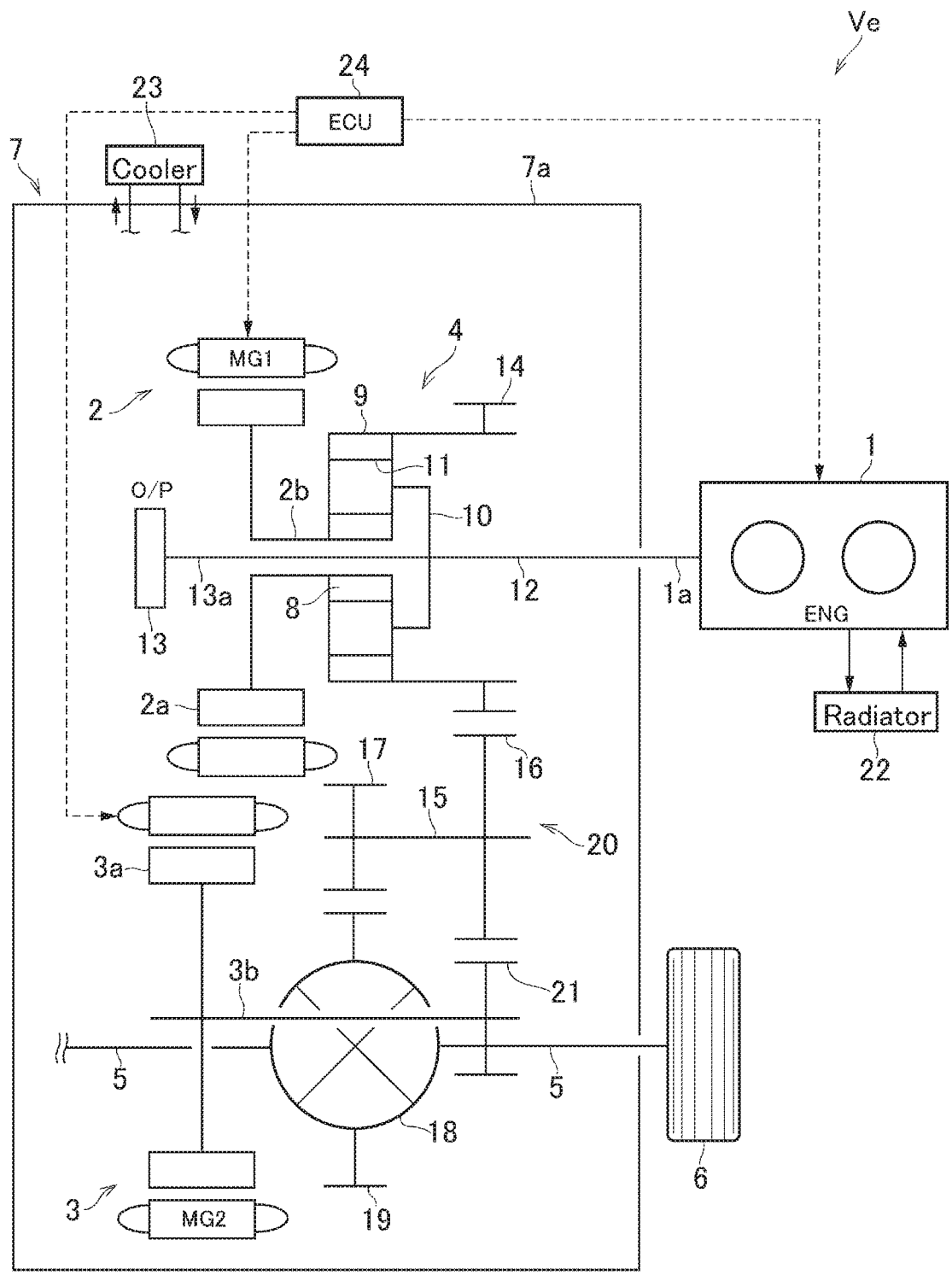
FIG. 1 is a schematic illustration showing one example of the hybrid vehicle to which the control system according to the exemplary embodiment of the present disclosure is applied.

Referring now to FIG. 1, there is shown one example of a powertrain of a hybrid vehicle (as will be simply called the "vehicle" hereinafter) Ve to which the control system according to the exemplary embodiment of the present disclosure is applied. A prime mover of the vehicle Ve comprises an engine (referred to as ENG in FIG. 1) 1, a first motor (referred to as MG1 in FIG. 1) 2, and a second motor (referred to as MG2 in FIG. 1) 3. In the vehicle Ve, an output power of the engine 1 is distributed to the first motor 2 and driveshafts 5 through a power split mechanism 4. An electric power generated by the first motor 2 may be supplied to the second motor 3 to generate torque, and a drive force generated by the second motor 3 may be delivered to the drive wheels 6 through the driveshafts 5. The driving forces generated by the engine 1, the first motor 2, and the second motor 3 are transmitted to the drive wheels 6 through a transmission system 7 as a powertrain including a power split mechanism 4. In the vehicle Ve, the power split mechanism 4, a counter gear unit, a deferential gear unit and so on are held in a transmission housing 7a.

For example, an internal combustion engine such as a gasoline engine and a diesel engine may be adopted as the engine 1. An output power of the engine 1 may be adjusted electrically, and the engine 1 may be started and stopped electrically according to need. Given that the gasoline engine is used as the engine 1, an opening degree of a throttle valve, an amount of fuel supply or fuel injection, a commencement and a termination of ignition, an ignition timing etc. may be controlled electrically. Otherwise, given that the diesel engine is used as the engine 1, an amount of fuel injection, an injection timing, an opening degree of a throttle valve of an Exhaust Gas Recirculation (EGR) system etc. may be controlled electrically.

Each of the first motor 2 and the second motor 3 is a motor-generator that is operated not only as a motor to generate torque by applying electric power thereto, but also as a generator to generate electric power by applying torque thereto. For example, a permanent magnet synchronous motor and an induction motor may be used individually as the first motor 2 and the second motor 3. The first motor 2 and the second motor 3 are electrically connected to a storage device such as a battery and a capacitor through an inverter (neither of which are shown) so that electric power may be supplied to the first motor 2 and the second motor 3 from the storage device. The storage device may also be charged with electric powers generated by the first motor 2 and the second motor 3.

The power split mechanism 4 as a differential mechanism is disposed between the engine 1 and the first motor 2. According to the embodiment of the present disclosure, a single-pinion planetary gear unit is adopted as the power split mechanism 4 to transmit torque between: the engine 1 and the first motor 2; and the drive wheels 6. The power split mechanism 4 comprises a sun gear 8 as a third rotary element, a ring gear 9 as a second rotary element arranged concentrically with the sun gear 8, a plurality of pinion gears 11 interposed between the sun gear 8 and the ring gear 9, and a carrier 10 as a first rotary element supporting the pinion gears 11 in a rotatable and revolvable manner.

The power split mechanism 4 is arranged coaxially with the engine 1 and the first motor 2. Specifically, an output shaft 1a of the engine 1 is connected to the carrier 10 of the power split mechanism 4 so that the output shaft 1a serves as an input shaft 12 of the power split mechanism 4. In order to cool and lubricate the power split mechanism 4, and to reduce fevers of the first motor 2 and the second motor 3, an oil pump 13 is arranged on an opposite side of the engine 1 across the power split mechanism 4. Specifically, the carrier 10 of the power split mechanism 4 is also connected to a rotary shaft 13a of the oil pump 13 so that the oil pump 13 is driven by the engine 1 to generate hydraulic pressure.

The first motor 2 is disposed between the oil pump 13 and the power split mechanism 4, and in the first motor 2, a hollow rotor shaft 2b that is rotated integrally with a rotor 2a is connected to a hollow rotary shaft of the sun gear 8 of the power split mechanism 4. The rotary shaft 13a of the oil pump 13 penetrates through the rotor shaft 2b and the sun gear 8 to be connected to the output shaft 1a of the engine 1.

A first drive gear 14 as an external gear is integrally formed around the ring gear 9 of the power split mechanism 4 to serve as an output member, and a countershaft 15 is arranged in parallel with a common rotational axis of the power split mechanism 4 and the first motor 2. A counter driven gear 16 diametrically larger than the first drive gear 14 is fitted onto one end of the countershaft 15 (i.e., right side in FIG. 1) to be rotated integrally therewith while being meshed with the first drive gear 14 so that torque transmitted from the first drive gear 14 is multiplied. A counter drive gear 17 is fitted onto the other end of the countershaft 15 (i.e., left side in FIG. 1) in such a manner as to be rotated integrally therewith while being meshed with a differential ring gear 19 of a deferential gear unit 18 as a final reduction. Thus, the ring gear 9 of the power split mechanism 4 is connected to a driveshaft 5 and the drive wheel 6 through an output gear train 20 including the first drive gear 14, the countershaft 15, the counter driven gear 16, the counter drive gear 17, and the differential ring gear 19.

In the powertrain of the vehicle Ve, an output torque of the second motor 3 can be added to the torque delivered from the power split mechanism 4 to the drive wheels 6 through the driveshaft 5. To this end, a rotor 3a of the second motor 3 is connected to a rotor shaft 3b extending in parallel with the countershaft 15 to rotate integrally therewith, and a second drive gear 21 is fitted onto a leading end of the rotor shaft 3b to be rotated integrally therewith while being meshed with the counter driven gear 16. Thus, the ring gear 9 of the power split mechanism 4 is connected to the second motor 3 through the differential ring gear 19 and the second drive gear 21. That is, the ring gear 9 and the second motor 3 are individually connected to the drive wheels 6 through the differential ring gear 19 and the driveshafts 5.

A radiator 22 is disposed in the vicinity of the engine 1 to cool coolant water by exchanging heat of the coolant water and external air, and an oil cooler 23 is disposed outside of the transmission housing 7a to cool oil supplied to a cooling object such as the first motor 2, the second motor 3, the power split mechanism 4 and so on.

An operating mode of the vehicle Ve may be selected from a hybrid mode (to be abbreviated as the "HV mode" hereinafter) in which the vehicle Ve is powered by the engine 1, and an electric vehicle mode in which the vehicle Ve is powered by the first motor 2 and the second motor 3 while supplying electric power to the motors 2 and 3 from the storage device.

The operating mode of the vehicle Ve is selected by an electronic control unit (to be abbreviated as the "ECU" hereinafter) 24 as a controller that is electrically connected to the engine 1, the first motor 2 and the second motor 3. The ECU 24 includes a microcomputer as its main component, and the ECU 24 is configured to carry out a calculation based on incident data and stored data such as maps, and transmit a calculation result in the form of command signal. For example, the ECU 24 receives data about temperatures of the first motor 2 and the second motor 3, a temperature of the oil for cooling the cooling object, a temperature of the oil entering into the oil cooler 23, a temperature of the oil discharged from the oil cooler 23, a temperature of the coolant water of the radiator 22, a vehicle speed, a wheel speed, a position of an accelerator pedal, a state of charge (to be abbreviated as the "SOC" hereinafter) level of the storage device and so on. Specifically, maps determining the operating mode, an optimum fuel efficiency curve of the engine 1, an output power of the engine 1 with respect to a position of the accelerator pedal, a thermal efficiency of the engine 1 and so on are installed in the ECU 24. For example, the ECU 24 transmits command signals for starting and stopping the engine 1, torque command signals for operating the first motor 2 and the second motor 3 and so on. Optionally, a plurality of the ECUs may be arranged in the hybrid vehicle according to need.

In the HV mode, the output power of the engine 1 is delivered to the drive wheels 6 by connecting the engine 1 to the power split mechanism 4 while applying reaction torque of the first motor 2 to the power split mechanism 4. In this situation, in the power split mechanism 4, the sun gear 8 serves as the reaction element. That is, the first motor 2 generates reaction torque counteracting the output torque of engine 1 so as to deliver the output torque of the engine 1 to the drive wheels 6.

A rotational speed of the first motor 2 may be controlled arbitrarily in accordance with a value and a frequency of current applied thereto, and a speed of the engine 1 may be controlled by controlling the rotational speed of the first motor 2. Basically, the speed of the engine 1 is adjusted by the first motor 2 in an optimally fuel efficient manner. Specifically, the operating point of the engine 1 is governed by a torque and a speed of the engine 1, and the speed of the engine 1 is adjusted by the first motor 2 in such a manner that the operating point of the engine 1 is shifted along the optimum fuel efficiency curve. That is, an output torque and a speed of the first motor 2 are determined in accordance with the output torque of the engine 1 transmitted to the power split mechanism 4.

Thus, during propulsion in the HV mode, the engine 1 is controlled in such a manner that the operating point of the engine 1 is shifted along the optimum fuel efficiency curve so as to improve thermal efficiency and fuel efficiency. Consequently, fuel consumption can be reduced but an amount of heat generation in the transmission housing 7a holding the first motor 2, the second motor 3, the power split mechanism 4 and so on may be increased. Specifically, the motors 2 and 3 are heated during operation due to a mechanical loss, an iron loss, a copper loss or the like, and a temperature of the oil in the transmission system 7 will be raised by the heats of the motors 2 and 3. If the temperature of the oil is thus raised, the motors 2 and 3 may not be cooled properly by the oil, and the temperatures of motors 2 and 3 may be raised excessively. As a result, the motors 2 and 3 as well as other members in the transmission system 7 may be damaged thermally.

Figure 2:
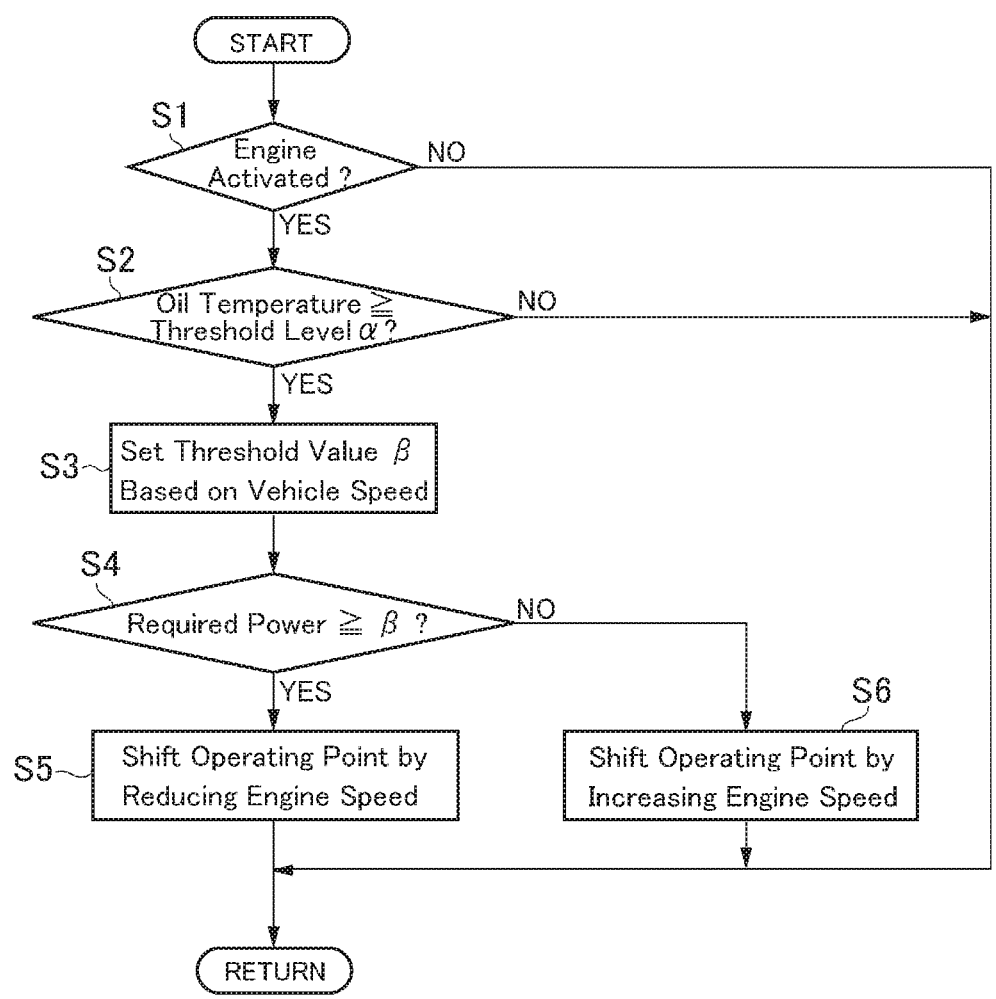
FIG. 2 is a flowchart showing one example of a routine executed by the control system according to the exemplary embodiment of the present disclosure.

The above-mentioned mechanical loss includes a friction loss resulting from rotating the rotor shaft 2b of the first motor 2, and a friction loss between the gears of the power split mechanism 4 meshing with each other. Such mechanical loss is increased with an increase in the rotational speed of the first motor 2 in both forward and reverse directions. The control system according to the embodiment of the present disclosure is configured to suppress heat generation in the transmission system 7 by shifting the operating point of the engine 1, without modifying the structure of the vehicle Ve. For this purpose, the ECU 24 executes the routine shown in FIG. 2.

At step S1, it is determined whether the engine 1 is activated. In other words, it is determined whether the vehicle Ve is propelled in the HV mode in which the vehicle Ve is powered by the engine 1. If the engine 1 is stopped e.g., in the EV mode so that the answer of step S1 is NO, the routine returns.

By contrast, if the vehicle Ve is propelled in the HV mode so that the answer of step S1 is YES, the routine progresses to step S2 to determine whether a temperature of the oil is equal to or higher than a predetermined threshold level $\alpha$. That is, it is determined whether the oil can be cooled properly by the oil cooler 23. In other words, it is determined at step S2 whether a temperature in the transmission system 7 including the first motor 2, the second motor 3, the power split mechanism 4 to be cooled is higher than a predetermined level. Normally, the operating point of the engine 1 is controlled along the optimum fuel efficiency curve to improve the fuel efficiency. If the temperature in the transmission system 7 is too high, the above-mentioned cooling objects will be heated excessively thereby increasing the power loss.

Thus, the temperature of the oil is employed as a parameter to determine the heat generation in the transmission system 7, and the threshold level $\alpha$ may be set based on a result of an experimentation taking account of the above-explained power loss and durability of the cooling objects. If the temperature of the oil is lower than the predetermined threshold level $\alpha$ so that the answer of step S2 is NO, the routine returns.

Such determination at step 32 may also be made based on a temperature of at least one of the first motor 2, the second motor 3, the oil entering into the oil cooler 23, the oil discharged from the oil cooler 23, the coolant water of the radiator 22. Instead, such determination at step S2 may also be made based on a change amount in the temperature of the oil.

If the answer of step S2 is NO, this means that an amount of heat generation in the transmission system 7 is relatively small, and the temperature of the oil can be lowered by the oil cooler 23 to an appropriate level. In this case, therefore, the operating point of the engine 1 is controlled along the optimum fuel efficiency curve to improve the fuel efficiency.

By contrast, if the temperature of the oil is equal to or higher than the threshold level α so that the answer of step S2 is YES, the routine progresses to step S3 to set a threshold value ß of a required power to be generated by the engine 1 at a predetermined vehicle speed. To this end, the ECU 24 calculates the required power based on a required drive force represented by a position of the accelerator pedal and a speed of the vehicle Ve. Specifically, the threshold value ß is a reference value to control the operating point of the engine 1, and set on the optimum fuel efficiency curve. In a case that the temperature of the oil is equal to or higher than the predetermined threshold level α, the cooling objects in the transmission system 7 would be heated excessively if the engine 1 is operated at an operating point on the optimum fuel efficiency curve. As described later, in the case that the temperature of the oil is equal to or higher than the predetermined threshold level α, the operating point of the engine 1 is shifted from the optimum fuel efficiency curve along a constant output curve. For this purpose, maps determining the power loss to be caused in the transmission system 7 depending on an operating condition of the engine 1 provided that the oil temperature is higher than the threshold level α is prepared at each predetermined vehicle speed (e.g., at every 20 km/h), and those maps are installed in the ECU 24. Each of the above-mentioned maps is a graph in which the vertical axis represents an engine torque and the horizontal axis represents an engine speed, and constant output curves are drawn while crossing the optimum fuel efficiency curve. In the case that the temperature of the oil is equal to or higher than the predetermined threshold level α, the ECU 24 determines the operating point of the engine 1 possible to reduce the power loss with reference to the above-mentioned maps.

As described, the power loss (especially the mechanical loss) in the transmission system 7 is increased with an increase in the speed of the first motor 2. That is, the heat generation in the transmission 7 can be suppressed by restricting the speed of the first motor 2 within a low speed range. To this end, the threshold value ß of the required power is set to a predetermined point on the optimum fuel efficiency curve at which the speed of the first motor 2 can be restricted within the predetermined low speed range. In other words, the threshold value ß is set to a point on the optimum fuel efficiency curve at which the heat generation in the transmission system 7 can be minimized.

The predetermined low speed range of the first motor 2 is set in both rotational directions across zero, and the threshold value ß is altered at each of the above-mentioned predetermined vehicle speeds. Specifically, the threshold value ß is increased with an increase in the vehicle speed.

Figure 3:
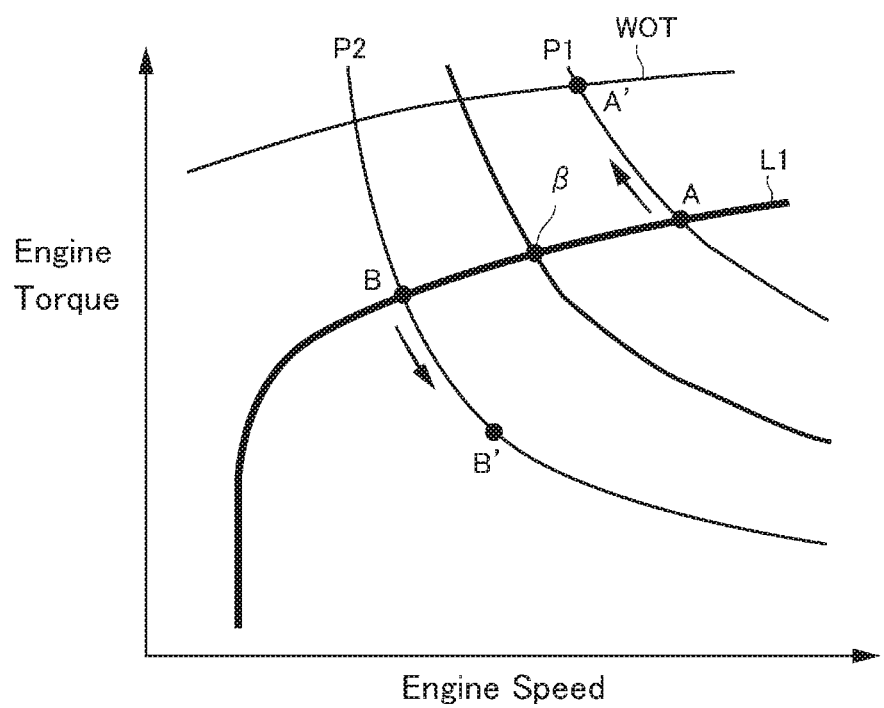
FIG. 3 is a map determining an operating point of an engine with respect to an optimum fuel efficiency curve.

Turning to FIG. 3, there is shown one example of the map determining the operating point of the engine 1. In FIG. 3, the vertical axis represents an engine torque and the horizontal axis represents an engine speed, and threshold value ß is set on the optimum fuel efficiency curve L1. In FIG. 3, WOT is a power line indicating a maximum output torque of the engine 1, and P1 and P2 are constant output curves (P1>P2). The inventors of the present disclosure have found a fact that the power loss in the transmission system 7 can be reduced in a high-power side from the threshold value ß (i.e., in the right side in FIG. 3) by shifting the operating point of the engine 1 in a direction to reduce the engine speed, and that the power loss in the transmission system 7 can be reduced in a low-power side from the threshold value ß (i.e., in the left side in FIG. 3) by shifting the operating point of the engine 1 in a direction to increase the engine speed.

Turning back to FIG. 2, at step S4, it is determined whether the required power is equal to or greater than the threshold value ß set at step S3. Thus, the threshold value ß is a reference value to determine the direction to shift the operating point of the engine 1 for the purpose of reducing the power loss in the transmission system 7. If the required power is equal to or greater than the threshold value ß so that the answer of step S4 is YES, the routine progresses to step S5 to shift the operating point of the engine 1 by reducing the speed of the engine 1. For example, given that the required power is P1 that is greater than the threshold value ß, the operating point of the engine 1 is normally set to a point A on the optimum fuel efficiency curve L1. However, as explained above, the heat generation in the transmission system 7 may be increased thereby increasing the power loss if the engine 1 is operated at the point A. In this case, therefore, the ECU 24 shifts the operating point of the engine 1 from the point A to a point A' at which the power loss in the transmission system 7 is reduced, by adjusting the speed of the first motor 2 within the low speed range in such a manner as to reduce the speed of the engine 1.

Figure 4:
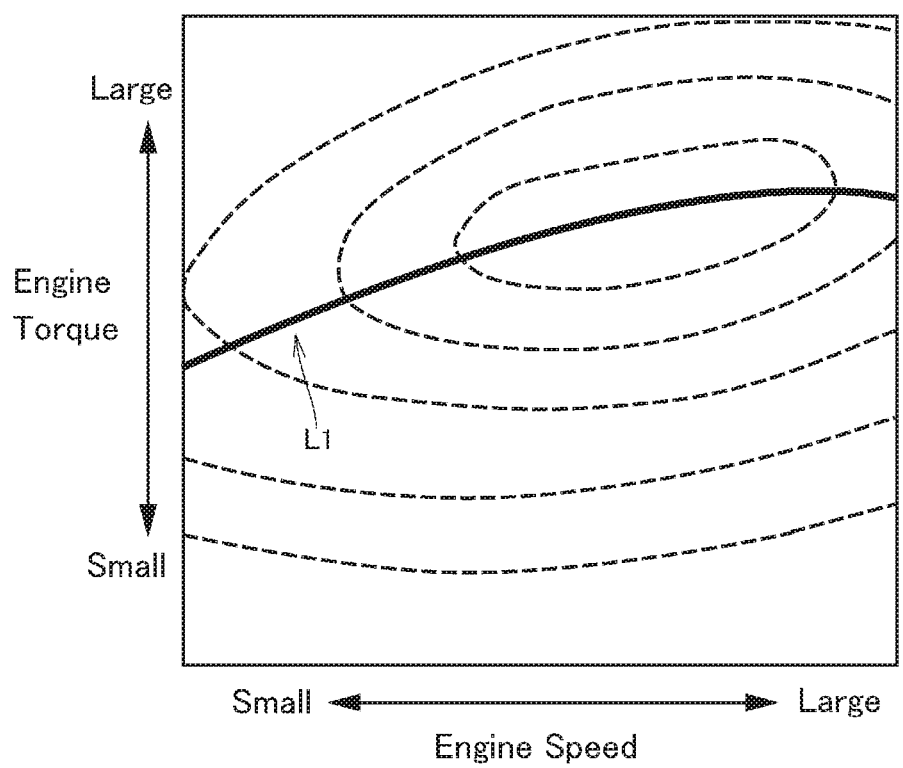
FIG. 4 is a graph indicating thermal efficiency of the engine.

Thus, in order to achieve the required power P1, the operating point of the engine 1 is shifted to the point A' along the constant output curve of the required power P1. FIG. 4 shows a thermal efficiency of the common engine. In FIG. 4, a thermal efficiency of the engine within each region enclosed by the dashed contour is same. Specifically, the thermal efficiency is optimized by operating the engine along the optimum fuel efficiency curve L1, and reduced if the operating point is deviated from the optimum fuel efficiency curve L1. Specifically, the point A' is set to a point at which the power loss in the transmission system 7 can be suppressed while maintaining the thermal efficiency of the engine 1 to an acceptable efficiency.

That is, the point A' is set in such a manner as to maintain the energy efficiency of the engine 1 taking account of the thermal efficiency of the engine 1 and the power loss in the transmission system 7. In the example shown in FIG. 3, specifically, the point A' is set at an intersection between the line WOT indicating the maximum output torque of the engine 1 and the constant output curve of the required power P1.

By contrast, if the required power is less than the threshold value ß so that the answer of step S4 is NO, the routine progresses to step S6 to shift the operating point of the engine 1 by increasing the speed of the engine 1. For example, given that the required power is P2 that is less than the threshold value ß, the operating point of the engine 1 is normally set to a point B on the optimum fuel efficiency curve L1. However, as explained above, the heat generation in the transmission system 7 may be increased thereby increasing the power loss if the engine 1 is operated at the point B. In this case, therefore, the ECU 24 shifts the operating point of the engine 1 from the point B to a point B' at which the power loss in the transmission system 7 is reduced, by adjusting the speed of the first motor 2 within the low speed range in such a manner as to increase the speed of the engine 1. The point B' is also set in such a manner as to maintain the energy efficiency of the engine 1 taking account of the thermal efficiency of the engine 1 and the power loss in the transmission system 7. In the example shown in FIG. 3, specifically, the point B' is also adjusted on the constant output curve of the required power P2 to suppress the power loss in the transmission system 7 while maintaining the thermal efficiency of the engine 1 to an acceptable efficiency.

Thus, in the case that the temperature of the oil is higher than the threshold level α, the power loss is expected to be increased by the heat in the transmission system 7. In order to reduce such power loss in the transmission system 7, if the required power is greater than the threshold value ß, the control system according to the embodiment of the present disclosure lowers the speed of the engine 1 to shift the operating point of the engine 1 from the optimum fuel efficiency curve to the point at which the power loss in the transmission system 7 can be reduced. By contrast, if the required power is less than the threshold value ß, the control system raises the speed of the engine 1 to shift the operating point of the engine 1 from the optimum fuel efficiency curve to the point at which the power loss in the transmission system 7 can be reduced. According to the embodiment of the present disclosure, therefore, the power loss in the transmission system 7 resulting from heat generation can be reduced while achieving the required power by the engine 1.

As described, the speed of the engine 1 is changed by adjusting the speed of the first motor 2 within the low speed range. Consequently, the mechanical loss and the friction loss of the rotary members in the transmission system 7 resulting from rotating the first motor 2 are reduced so that the temperatures of the rotary members are lowered. For this reason, thermal damages on the first motor 2 and the rotary members can be limited. Thus, according to the embodiment of the present disclosure, the heat generation in the transmission system 7 can be suppressed without enhancing cooling performance of the existing cooling device such as the oil cooler 23, and without employing an additional cooling system. In other words, the heat generation in the transmission system 7 can be suppressed without increasing a manufacturing cost of the vehicle.

As also described, the operating point of the engine 1 is set in such a manner as to reduce the power loss in the transmission system 7 without reducing the thermal efficiency of the engine 1. For this reason, total energy efficiency of the vehicle Ve can be improved. Further, in the case that the temperature of the oil in the transmission system, the operating point of the engine 1 is controlled along the optimum fuel efficiency curve. In this case, therefore, the fuel efficiency of the engine 1 can be improved.

Although the above exemplary embodiments of the present application have been described, it will be understood by those skilled in the art that the present application should not be limited to the described exemplary embodiments, and various changes and modifications can be made within the spirit and scope of the present application. For example, the heat generation in the transmission system 7 may also be estimated based on at least one of the temperatures of the first motor 2, the second motor 3, the oil entering into the oil cooler 23, the oil discharged from the oil cooler 23, the coolant water of the radiator 22.

In addition, the control system according to the present disclosure may be applied to any kind of the vehicle irrespective of the drive system. That is, the control system according to the present disclosure may be applied not only to the front-engine front-drive layout vehicle as shown in FIG. 1, but also to a front-engine rear-drive vehicle. Further, a double-pinion planetary gear unit or a Ravigneaux planetary gear unit may also be employed as the power split mechanism 4.

What is claimed is:

1. A control system for a hybrid vehicle comprising:
an engine;
at least one motor;
a transmission system that transmits an output torque of the engine to drive wheels; and
a cooling system that cools the transmission system and the engine,
wherein the transmission system includes a differential mechanism comprising a first rotary element to which the torque of the engine is applied, a second rotary element which is connected to the drive wheels in a torque transmittable manner, and a third rotary element to which a torque of the motor is applied, and
the hybrid vehicle can be propelled in a hybrid mode by delivering the torque of the engine to the drive wheels,
the control system comprising:
a controller that controls the engine and the motor,
wherein the controller is configured to
control the operating point of the engine by the motor,
suppress a heat generation in the transmission system by adjusting a speed of the motor within a predetermined low speed range thereby shifting the operating point of the engine to the point at which the heat generation in the transmission system can be suppressed, and
in a case that a temperature in the transmission system is lower than a threshold level during propulsion in the hybrid mode, the controller is further configured to control the engine at an optimally fuel efficient point, and
in a case that the temperature in the transmission system is equal to or higher than the threshold level during propulsion in the hybrid mode, the controller is further configured to:
calculate a required power to be generated by the engine;
determine whether the required power is equal to or higher than a threshold value at a predetermined speed of the vehicle;
shift the operating point of the engine from the optimally fuel efficient point to a point at which the heat generation in the transmission system can be suppressed while achieving the required power by reducing the speed of the engine and increasing the torque of the engine in a case that the required power is equal to or higher than the threshold value; and
shift the operating point of the engine from the optimally fuel efficient point to a point at which the heat generation in the transmission system can be suppressed while achieving the required power by increasing the speed of the engine and reducing the torque of the engine in a case that the required power is less than the threshold value.

2. The control system for the hybrid vehicle as claimed in claim 1,
wherein the cooling system includes an oil cooler and a radiator, and
the controller is further configured to determine whether the temperature in the transmission system is equal to or higher than the threshold level based on at least one of temperatures of the motor, oil in the transmission system, coolant water of the radiator.

3. The control system for the hybrid vehicle as claimed in claim 1, wherein the threshold value is increased with an increase in the speed of the vehicle.

4. The control system for the hybrid vehicle as claimed in claim 2, wherein the threshold value is increased with an increase in the speed of the vehicle.

\* \* \* \* \*